United States Patent [19]

Ohkawachi et al.

[11] Patent Number: 5,677,055
[45] Date of Patent: Oct. 14, 1997

[54] THERMOPLASTIC POLYESTER RESIN STRETCHED FILM

[75] Inventors: Ichiro Ohkawachi; Kenji Nakajima, both of Ibaraki; Tsukasa Satoh, Mie, all of Japan

[73] Assignee: Oji-Yuka Synthetic Paper Co., Ltd., Tokyo, Japan

[21] Appl. No.: 768,469

[22] Filed: Dec. 18, 1996

[30] Foreign Application Priority Data

Jan. 23, 1996 [JP] Japan .................... 8-027375

[51] Int. Cl.$^6$ .................................... B32B 19/00
[52] U.S. Cl. ............ 428/357; 525/107; 525/109; 525/132; 525/166; 525/240; 525/437; 525/438; 525/445; 428/357
[58] Field of Search .................... 525/107, 109, 525/132, 166, 240, 437, 438, 445; 428/357

[56] References Cited

U.S. PATENT DOCUMENTS

| | | | |
|---|---|---|---|
| 4,318,950 | 3/1982 | Takashi et al. | 428/143 |
| 4,341,880 | 7/1982 | Toyoda et al. | 524/101 |
| 5,254,525 | 10/1993 | Nakajima et al. | 503/227 |
| 5,478,686 | 12/1995 | Kawakami et al. | 430/106.6 |

*Primary Examiner*—Samuel A. Acquah
*Attorney, Agent, or Firm*—Sughrue, Mion, Zinn, Macpeak and Seas

[57] ABSTRACT

A stretched resin film having as a base material a resin composition composed of the following components (A), (B), (C) and (D):

(A) a thermoplastic polyester resin
    100 parts by weight;
(B) a modified olefin based resin obtained by graft polymerizing 0.01 to 20 parts by weight of an α,β-unsaturated carboxylate based monomer having a hydroxyl group and 0.01 to 50 parts by weight of an aromatic vinyl compound onto 100 parts by weight of an olefin based resin
    3 to 100 parts by weight;
(C) a polyethylene resin having a molecular weight of 1,000 to 10,000
    1 to 10 parts by weight; and
(D) a bisphenol epoxy resin
    1 to 10 parts by weight.

5 Claims, No Drawings

THERMOPLASTIC POLYESTER RESIN STRETCHED FILM

FIELD OF THE INVENTION

The present invention relates to a stretched resin film having excellent heat resistance and which can be easily written upon (writing property).

The stretched resin film according to the present invention is free from heat shrinkage even at a temperature of about 150° C. and is stiff so that it does not curl even when heat is applied at the time of printing. Accordingly, it is useful as a paper such as an outdoor poster paper, a label paper, a drafting paper, a sticker paper, a bar code paper which is used with hot-melt adhesive at 80° to 100° C. or a photographic paper as a support for a heat sensitive recording paper or a heat transfer image receiving paper.

In particular, the film according to the present invention is suitable as a support for a recording paper used in an electrographic copying system or a printing system where toner is thermally fixed, such as a laser printer or an LED printer.

BACKGROUND OF THE INVENTION

Conventionally, a high-quality processed paper (which uses a plain paper copy sheet made of pulp and is often abbreviated "PPC") which has an improved printing property and a paper feeding/discharging property has mainly been used as a paper employed in an electrographic system or a printing system which thermally fixes toner, such as a laser printer or an LED printer.

On the other hand, an adhesive label having a bar code for production management or commodity management has been popularly used, and, whereby such the management has been tend to be computerized and accelerated. Reflecting such tendencies, a laser printer, LED printer or the like having excellent noise free and high speed properties has come to be frequently used. The above described adhesive label for management is required to have various strengths such as water proofness, abrasion resistance and stain resistance, according to the purpose(s) of use, so that it is difficult to use a conventional label which uses a pulp made material as a base material as such an adhesive label.

To meet such requirements, there have been attempts to use a water proof plastic film or polypropylene based synthetic paper.

In an electrographic system or a thermal toner fixing system such as a laser printer or an LED printer, a fixing roll is heated to a temperature as high as about 150° to 200° C., depending on the printing speed, because there is the necessity of melting a low melting point polyester used as a binder for the toner.

The conventional synthetic paper is obtained by stretching a film made of a polypropylene having a melting point (melt finishing temperature of DSC) of 178° C. and an inorganic filler at a temperature (120° to 163° C.) lower than the melting point of the polypropylene (U.S. Pat. Nos. 4,318,950 and 4,341,880). As a consequence, such a synthetic paper encounters the problem that when it is exposed to a temperature higher than or in the vicinity of the above stretching temperature, even though not for a long period of time, a large curling appears inside of the printed surface after fixing the toner and it becomes difficult to treat printed products which have been so exposed.

As a plastic film having excellent heat resistance, a biaxially stretched film of a polyethylene terephthalate based resin containing a polyolefin is known (JP-A-57-49648 (The term "JP-A" as used herein means an "unexamined published Japanese patent application")). This biaxially stretched film of a polyethylene terephthalate based resin has excellent heat resistance but it encounters the problem that, due to its small content of polyolefin based resin, it lacks in soft touch feeling and is inferior in feeding/discharging as a paper as compared with a commercially available polyolefin based synthetic paper.

Since a melt viscosity of a polyethylene terephthalate resin is very low and the range of the extruding temperature is very narrow, a film extruded from a die is vertically drawn substantially right above a cooling roll and chilled to avoid a draw down or suppress as much as possible vibration of the film which occurs during the time from the exit of the film from the die to the contact of it with the roll.

As methods of guiding a film to a chill roll, there have been proposed an electrostatic pinning method (JP-B-37-6142) in which static electricity is applied to a molten resin film extruded from a die to guide the film to a chill roll or a method of holding a film by a press roll contacting a chill roll. These methods are now in use. In addition to such means to improve the guiding of the film to the roll, it is necessary to use various devices for the suppression of all the vibrations which have influence on the film formation.

SUMMARY OF THE INVENTION

An object of the present invention is to provide a stretched resin film which can be produced even by an air knife for a cooling film, which is a guiding-to-chill-roll method generally employed for stretching a polyolefin resin film, which is also stable so as to show only a small irregular distribution of thickness. This is accomplished by mixing an excellent compatibilizing agent with the resin of the film, thereby maintaining the heat resistance of the polyester resin used, increasing the melt viscosity of the mixture containing the polyester resin used and enlarging the range of the extruding temperature.

Another object of the present invention is to provide a synthetic paper having a soft touch feeling which has not been achieved with a conventional polyethylene terephthalate based resin but only with a polyolefin based synthetic paper.

The present invention therefore provides a stretched resin film comprising as a base material a resin composition composed of the following components (A), (B), (C) and (D):

(A) a thermoplastic polyester resin
100 parts by weight;

(B) a modified olefin based resin obtained by graft copolymerizing 0.01 to 20 parts by weight of an $\alpha,\beta$-unsaturated carboxylate based monomer having one to six hydroxyl groups and 0.01 to 50 parts by weight of an aromatic vinyl compound onto 100 parts by weight of an olefin based resin
3 to 100 parts by weight;

(C) a polyethylene resin having a weight mean average molecular weight of 1,000 to 10,000 (which may be hereinafter referred to as "a low molecular weight polyethylene resin")
1 to 10 parts by weight; and (D) a bisphenol epoxy resin (glycidyl ether of a bisphenol)
1 to 10 parts by weight.

DETAILED DESCRIPTION OF THE INVENTION (1) Constituent components:

(A) Thermoplastic polyester resin

The thermoplastic polyester resin usable in the present invention can be prepared by condensation of one or less than three dicarboxylic acids or $C_1$ to $C_4$ alkyl diesters thereof such as terephthalic acid, terephthalic acid dimethyl, isophthalic acid, 2,5-, 2,6- or 2,7-naphtalene dicarboxylic acid, succinic acid, sebacic acid, adipic acid, azelaic acid, biphenyl-4,4'-dicarboxylic acid, hexahydroterephthalic acid or bis-p-carboxyphenoxyethane with one or less than four glycols such as ethylene glycol, 1,3-propanediol, neopentyl glycol or 1,4-cyclohexanedimethanol and, in addition, less than 30 mol % of an oxycarboxylic acid such as lactic acid or malic acid as needed.

Among them, polyethylene terephthalate and polybutylene terephthalate are preferred.

In addition, the thermoplastic polyester resin usable in the present invention may be a polyester copolymer, a block copolymer and so on.

(B) Modified olefin based resin

The modified olefin based resin usable in the present invention is obtained by graft copolymerization of an α,β-unsaturated carboxylate based monomer having one to six hydroxyl groups as a terminal group and an aromatic vinyl compound onto an olefin based resin. In the graft copolymer, the ratio of the hydroxyl groups contained in the resulting modified olefin based resin to the total amount of the hydroxyl groups contained in the α,β-unsaturated carboxylate ester based monomer which has been subjected to graft polymerization, that is, the residual hydroxyl ratio, is preferred to fall within a range of 0.3 to 1.0.

Examples of the α,β-unsaturated carboxylate based monomer having one to six hydroxyl groups added to modify an olefin based resin include 2-hydroxyethyl methacrylate, 2-hydroxyethyl acrylate, 2-hydroxypropyl methacrylate, 2-hydroxypropyl acrylate, 2,3-dihydroxypropyl methacrylate, 2,3-dihydroxypropyl acrylate, 2-hydroxymethyl-3-hydroxypropyl methacrylate, 2-hydroxymethyl-3-hyroxypropyl acrylate, 2,2-dihydroxymethyl-3-hydroxypropyl methacrylate, 2,2-dihydroxy-methyl-3-hydroxypropyl acrylate and a methacrylate or acrylate of an oligomer of ethylene glycol or propylene glycol having $C_{4-40}$; bis(2-hydroxyethyl)maleate, bis(2-hydroxyethyl)fumarate, bis(2-hydroxypropyl)maleate, bis(2-hydroxypropyl)maleate, bis(2-hydroxypropyl) fumarate, bis(2,3-hydroxypropyl)maleate, bis(2,3-hydroxypropyl)fumarate, bis(2-hydroxymethyl-3-hydroxypropyl)maleate, bis(2-hydroxymethyl-3-hydroxypropyl)fumarate, bis(2,2-hydroxymethyl-3-hydroxypropyl)maleate, bis(2,2-hydroxymethyl-3-hydroxypropyl)fumarate and a maleate or fumarate of an oligomer of ethylene glycol or propylene glycol having $C_{4-40}$.

Further, as described above, those of such monomers having two carboxyl groups esterified by a hydroxyalkyl group or half-esters having one carboxyl group esterified by a hydroxyalkyl group can be used as the maleate or fumarate.

The above-exemplified hydroxyl containing unsaturated carboxylates can be used either singly or in combination. Among them, 2-hydroxyethyl methacrylate, 2-hydroxyethyl acrylate, 2-hydroxypropyl acrylate, 2-hydroxypropyl methacrylate, 2-hydroxybutyl methacrylate and a methacrylate or acrylate of an oligomer of ethylene glycol or propylene glycol having $C_{4-40}$ are preferred.

Examples of the aromatic vinyl compound used for the modification of an olefin based resin include aromatic vinyl monomers such as styrene, α-methoxystyrene, o-methylstyrene, m-methylstyrene, p-methylstyrene, dimethylstyrene, 2,4,6-trimethylstyrene, chlorostyrene dichlorostyrene, bromostyrene, nitrostyrene, chloromethylstyrene, cyanostyrene, t-butylstyrene and vinyl naphthalene. Among them, styrene, α-methoxystyrene and methylstyrene are preferred. These aromatic vinyl compounds can be used either singly or in combination.

Illustrative of the crystalline (crystallinity 10 to 75%) olefin based resin which can be modified in the present invention are high density polyethylenes having a density of 0.945 to 0.970 g/cm$^3$, branched polyethylenes having a density of 0.880 to 0.944 g/cm$^3$, linear polyethylenes, poly (4-methylpentene-1)s, propylene homopolymers, propylen-ethylene copolymers, propylene-ethylene-butene-1 terpolymers, styrene-butadiene-styrene block copolymers and hydrogenated products thereof, ethylene-vinyl acetate copolymers and ethylene-glycidyl methacrylate copolymers. These crystalline olefin based resins may be used either singly or in combination. Among them, a propylene based resin is preferred from the viewpoint of rigidity.

Examples of the method used to modify the olefin based resin with the hydroxyl containing α,β-unsaturated carboxylate based monomer and the aromatic vinyl compound include a method in which the olefin based resin, hydroxyl containing α,β-unsaturated carboxylate ester based monomer and aromatic vinyl compound are reacted in the presence or absence of a radical forming agent such as an organic peroxide, a method in which they are exposed to ultraviolet rays or radiation and a method in which they are brought into contact with oxygen or ozone.

For preparing a modified olefin based resin which has a residual hydroxyl ratio falling within a range of from 0.3 to 1.0, the hydroxyl group being derived from the hydroxyl containing α,β-unsaturated carboxylate based monomer which has been graft polymerized onto the olefin based resin, any process can be employed insofar as it does not consume the hydroxyl group, which will eventually be reacted with the thermoplastic polyester resin, of the hydroxyl containing α,β-unsaturated carboxylate based monomer which has been graft polymerized onto the olefin based resin.

The content of the α,β-unsaturated carboxylate based monomer which has a hydroxyl group grafted onto the olefin based resin ranges from 0.01 to 20 parts by weight, preferably 0.05 to 10 parts by weight, based on 100 parts by weight of the olefin based resin. When the content of the hydroxyl containing α,β-unsaturated carboxylate based monomer is less than 0.01 part by weight, the compatibility improving effect is small, while contents exceeding 20 parts by weight cause gelation or the like, leading to difficulty in molding and processing capability. Contents outside the above range are therefore not preferred.

The amount of the aromatic vinyl compound to be grafted onto the olefin based resin is 0.01 to 50 parts by weight, preferably 0.05 to 20 parts by weight, based on 100 parts by weight of the olefin based resin. Amounts of the aromatic vinyl compound less than 0.01 part by weight bring about only a small compatibility improving effect. Amounts exceeding 50 parts by weight, on the other hand, cause a deterioration in the external appearance of the product or a lowering of the mechanical strength thereof. Amounts outside the above range are therefore not preferred. At the same time, it is preferred that the ratio of the hydroxyl containing α,β-unsaturated carboxylate based monomer (a) to the aromatic vinyl compound (b), that is, (a):(b), falls within the range of from 1:99 to 99:1 as a weight ratio, with a range of from 10:90 to 90:10 as a weight ratio being more preferred. When the weight ratio is outside the above range, it becomes difficult to conduct stretching of a film or the stretched resin film becomes brittle.

The residual hydroxyl ratio derived from the hydroxyl containing α,β-unsaturated carboxylate which has been graft polymerized onto the olefin based resin preferably falls within the range of from 0.3 to 1.0, with a range of from 0.4 to 1.0 being more preferred. At a residual hydroxyl ratio less than 0.3, the improving effect of enlarging the range of the temperature is lower.

It is preferred that the modified olefin based resin described above has an MFR (230° C., load of 2.16 kg) of 0.01 to 200 g/10 minutes as measured in accordance with JIS K-7201, with 0.1 to 100 g/10 minutes being more preferred.

(C) Low molecular weight polyethylene resin

The low molecular weight polyethylene, which is component (C), for use in the present invention has a weight mean average molecular weight of 10,000 or smaller, preferably 1,000 to 8,000. Specific examples include polyethylene wax, paraffin and carnauba wax.

(D) Epoxy resin

The bisphenol epoxy resin, which is component (D), for use in the present invention is a reaction product of bisphenol A, bisphenol F or bisphenol S with epichlorohydrin. The epoxy equivalent of the resin is 2,000 g/eq or lower. Di-glycidyl ether of a bisphenol A which has an epoxy equivalent of 120 to 500 g/eq is preferred.

(E-1) Additional components

It is possible to selectively disperse in the modified olefin resin a polymer, for example, having a glass transition point of 100° C. or higher or a melting point of 180° to 350° C., or a polymer having a solubility parameter δ (SP value: solubility parameter) of 7.9 to 14.

Illustrative of such a polymer are unmodified olefin resins, cyclic olefin based random copolymers, aromatic polycarbonate and polyamides such as nylon 6, nylon 6,6.

In addition, it is possible to add, as an inorganic filler, calcium carbonate, silica, talc, mica, potassium silicate or potassium titanate having a particle size of 0.05 μm to 5 μm in an amount not greater than 300 parts by weight based on 100 parts by weight in total of all resins present.

Further, it is possible to add a stabilizer, ultraviolet absorber, dispersant, dye and/or pigment which are conventional compounding ingredients in the art. The amounts used are conventional.

Component ratio

The component ratio of components (A), (B), (C) and (D) in the resin composition is as follows:

(A) thermoplastic polyester resin
  100 parts by weight;
(B) modified olefin based resin
  3 to 100 parts by weight;
(c) polyethylene resin having a weight mean average molecular weight of 1,000 to 10,000
  1 to 10 parts by weight; and
(D) bisphenol epoxy resin
  1 to 10 parts by weight.

If the amount of component (B) is less than 3 parts by weight based on 100 parts by weight of component (A), sufficient compatibility with component (A) is not obtained and, in addition, the thermoplastic resin component (A) will not exhibit a sufficient effect in improving the extruding. If component (B) is added in an amount exceeding 100 parts by weight, inversion of the resin of the matrix phase component (A) to component (B) occurs and the modified olefin becomes the matrix, whereby desired molded products, such as a film having sufficient heat resistance, cannot be obtained.

When component (C) is added in an amount less than 1 part by weight, no improvement in the molding property is observed. Amounts exceeding 10 parts by weight, on the other hand, cause a lowering of the heat resistance.

When the amount of component (D) is less than 1 part by weight, it becomes impossible for the water present in the ambient air, which will be adsorbed into the composition, to preferentially adsorb to the epoxy resin, which is component (D), and thereby prevent hydrolysis of the polyester resin (A). Amounts exceeding 10 parts by weight, on the other hand, cause delamination in the resulting sheet.

Fabrication of a stretched film

A stretched resin film according to the present invention can be fabricated by kneading a resin composition containing (A) the thermoplastic polyester resin, (B) the modified olefin based resin, (C) the low molecular weight polyethylene resin and (D) the bisphenol epoxy resin in an extruder at a temperature exceeding the melting point of the thermoplastic polyester resin, for example, at an extruding temperature of from 260° C. to 300° C., thereby dispersing the modified olefin based resin, low molecular weight polyethylene and bisphenol epoxy resin in the thermoplastic polyester resin which serves as a matrix resin, extruding the resulting dispersion through a die into a film with the thermoplastic polyester resin being present in amorphous form, stretching the thus-obtained film at a temperature (for example, 60° to 120° C.) not higher than the recrystallization temperature of the thermoplastic polyester resin at least uniaxially at a stretch ratio of 3.5 to 12, preferably at a stretch ratio of 3 to 5.5 in the extrusion direction (i.e., machine direction, MD) and at a stretch ratio of 3 to 5 in the transverse direction (TD), and then annealing the stretched film at a temperature (for example, 130° to 170° C. for polyethylene terephthalate) more higher than the recrystallization temperature of the polyester resin to recrystallize the polyester resin.

After fabrication of the stretched film according to the present invention, a further resin layer may be laminated on the stretched film as needed. Examples of the resin for the further resin layer include olefin based resins such as ethylene based resins such as branched polyethylene, linear polyethylene, or propylene based resins such as propylene homopolymer, propylene-ethylene copolymer, saturated polyester resins such as polyethylene terephthalate or polybutylene terephthalate, polyamide resins such as nylon 6 or nylon 6,6, polyvinyl chloride and polystyrene. In the case of such a resin layer, a conventional filler such as calcium carbonate, titanium dioxide, clay or barium sulfate may be contained in the resin composition used to form the resin layer in an amount not greater than 50 wt. % and a UV absorber or an antioxidant may be contained in the resin composition used to form the resin layer in an amount not greater than 2 wt. %.

By stretching the resin film of the present invention, microvoids are formed inside the film, which makes a stretched resin film lighter and semi-transparent or opaque. Furthermore, the surface of the stretched resin film is roughened (matte).

The degree of roughness of the roughened surface of the film falls within a range of from 800 to 6,000 seconds, preferably a range of from 1,000 to 4,500 seconds, in terms of the Beck index (JIS P-8119).

The thickness of the stretched resin film falls within a range of from 20 µm to 300 µm, preferably, a range of from 40 µm to 150 µm, when it is composed only of a stretched film of the resin which is the base material of the present invention.

When the stretched resin film according to the present invention is used to form a laminated film of at least two layers, the film thickness of the stretched resin film of the present invention per se is 1 µm to 150 µm, with 3 µm to 120 µm being preferred. One or more other films which may or may not have a thickness different from that of the stretched resin film of the present invention is/are applied to the stretched resin film to give a total film or laminate thickness of the laminated film to 30 µm to 300 µm.

(3) Applications

The stretched resin film according to the present invention is useful by itself as a poster paper, a drafting paper or a label paper; or is useful as a support for a printing paper, a heat sensitive recording paper or a thermal transfer image receiving paper, using the stretched resin film alone or upon laminating the same with another paper, a polyester or the like, whereafter, if desired, one can form a gelatin layer, a heat-sensitive recording coating layer or an image receiving recording layer on the surface of the stretched film.

The present invention will hereinafter be described more specifically by the following test Examples.

Evaluation Methods Used

The evaluations in the Examples and Comparative Examples were conducted in accordance with the following evaluation methods.

Opacity: in accordance with JIS-P8138 (%)

Stability of stretching:

Ten test pieces were subjected to simultaneous biaxial stretching using a pantograph type biaxial stretching machine manufactured by Iwamoto Seisakujo Co., Ltd. and the number of test pieces which completed the stretching without rupture or departure from a chuck during the stretching was counted.

Thermal shrinkage:

Test pieces were allowed to stand without fixing their ends in circulation type thermostats at 120° C. or 150° C. for 30 minutes and 10 minutes, respectively. Then, the dimensional change (original length: Lo, the length of the test piece after being allowed to stand: L) of each test piece was measured and the thermal shrinkage was calculated from the following formula (unit: %):

$$\text{Thermal shrinkage} = \frac{Lo - L}{Lo} \times 100$$

Modulus in tension:

Modulus in tension was measured using a "TENSILON" measuring device from Orientech Co., Ltd. at a speed of a stress of 20 mm/min under the conditions of a temperature of 23° C. and a relative humidity of 50%.

Height of curling:

The stretched resin film was cut into pieces 200 mm by 200 mm to prepare test pieces. A test piece was followed by face up passing (with the printed surface upward) through a laser printer ("A404GII" from Canon Co., Ltd.) and obtained a test print. The average value (mm) that the four corners of the test piece rose or curled upward when the test piece was placed for one minute on a flat surface under the conditions of a temperature of 23° C. and a relative humidity of 50% was measured.

Pencil writing property:

Using a pencil hardness tester (scratch tester) manufactured by Toyo Seiki Co., Ltd., a load of 200 g was applied to a pencil having a hardness of H which had been set to be vertical to the test piece to be tested, and a line segment was drawn on the test piece at a speed of 200 sec/m. The line segment was visually observed and judged in accordance with the following standards:

o: clearly readable

Δ: difficult to read, because segment was lightly written x: almost no writing

Molding property of film:

The molding state of the film when an air knife was used for cast molding was visually observed and judged as follows:

o: Film could be molded without any problem

Δ: Film could be molded but was accompanied by entrainment of air in the film.

x: Film could not be molded because of vibration phenomenon of the film and entrainment of air in the film.

REFERENTIAL EXAMPLE 1

Preparation of a modified olefin based resin.

100 Parts of powder homopolymer of a propylene homopolymer (having a MFR at 230° C. of 1 g/10 min, a DSC peak temperature of 164° C. and a melting finishing temperature of 176° C.), 3 parts by weight of 2-hydroxyethyl methacrylate, 2 parts by weight of styrene and 1 part by weight of t-butyl peroxybenzoate were mixed in a super mixer, followed by kneading under the conditions of a cylinder temperature of 180° C. and a screw revolution number of 250 rpm. The kneaded mass was extruded from a die in strand form, followed by cutting, whereby the modified olefin based resin was obtained in the form of pellets having a diameter of about 3 mm.

After 0.3 g of the pellets so obtained was completely dissolved in 20 ml of xylene at temperature of 110° C., the resulting solution was poured into 150 ml of methanol to cause precipitation. Filtration and washing were both conducted twice, followed by drying under reduced pressure, whereby purified modified olefin based resin was obtained. The content of 2-hydroxyethyl methacrylate in the purified modified olefin based resin was determined by each of the following methods (1) and (2). As a result, the resin was found to have a 2-hydroxyethyl methacrylate content of 1.31% determined by the IR method and 0.94% determined by the NMR method. The residual hydroxyl ratio was 0.72 (0.94÷1.31).

Similarly, the styrene content of the purified modified olefin based resin was determined using a peak at 700 $cm^{-1}$ derived from 1-substituted benzene by the IR method. The result was 0.80% by weight.

Measuring method of residual hydroxyl ratio:

(1) Infrared spectroscopy (which is abbreviated as the "IR method" herein):

The purified modified olefin based resin was formed into a film using a press, followed by the measurement of the infrared spectrum thereof by the IR method. Based on the absorption at 1724 $cm^{-1}$ derived from carbonyl, the content of α,β-unsaturated carboxylate was determined from a conventional calibration curve which had been made in advance.

(2) Proton nuclear magnetic resonance method (which is abbreviated as the "NMR" method herein):

The purified modified olefin based resin (50 mg) was dissolved in about 2 ml of o-dichlorobenzene while heating the system at 130° C. A sample was prepared using dibenzene as a standard substance and its NMR spectrum was measured. Using the absorption of hydrogen-bonded methylene (chemical shift: 3.7 ppm) and methylene bonded thereto (chemical shift: 4.2 ppm), the content of α,β-unsaturated carboxylate was determined.

From the ratio of the contents obtained by the above two measuring methods, the residual hydroxyl ratio was found from the following formula:

Residual hydroxyl ratio=(content % obtained by the NMR method) / (content % obtained by the IR method)

EXAMPLES 1 TO 4, COMPARATIVE EXAMPLES 1 TO 6

In accordance with the component ratios shown in Table 1 and Table 2, a resin composition obtained by mixing in a tumbler 100 parts by weight of polyethylene terephthalate "TGS83A" (trade name) produced by Mitsubishi Chemical Corporation [η]=0.80 with 1 to 120 parts by weight of the modified olefin based resin (obtained in the above Referential Example 1) and 0.5 to 15 parts by weight of a low molecular weight polyethylene resin "SUNWAX 161P" (trade name; weight mean average molecular weight: 5,000) produced by Sanyo Chemical Industries, Ltd. was kneaded in a molten state in a twin-screw extruder (manufactured by The Japan Steel Works, Ltd.) at a temperature of 280° C., a screw revolution number of 250 rpm and a discharge rate of 20 kg/hour. At the midway of the cylinder of the extruder (along the extrusion direction), 0.5 to 15 parts by weight of a di-glycidyl ether of bisphenol A "EPICOAT 828" (epoxy equivalent: 184 g/eq) produced by Yuka Shell Epoxy Kabushiki Kaisha controlled at 70° C. was added to the resin composition using a pump. The molten composition so obtained was extruded from a die in the form of a strand, followed by cooling to 30° to 40° C. and then cutting, whereby pellets were obtained.

After the pellets so obtained were kneaded in the molten state using a single screw extruder (The Japan Steel Works, Ltd.) at 280° C., the kneaded composition was extruded from a die in the form of a sheet. Immediately after extrusion, the sheet was cooled to a temperature of 80° C., whereby a sheet 1.5 mm in thickness was obtained.

The sheet so obtained was cut into a piece of a size of 120 mm by 120 mm, whereby test pieces were prepared.

The resulting test pieces were heated to 100° C. using a small biaxial stretching machine (Iwamoto Seisakujo Co., Ltd.). After preheating for one minute, the test piece was subjected to simultaneous biaxial stretching at a stretch ratio of 4×4 at a stretching rate of 10 mm/sec. The film was then subjected to annealing at 155° C. for 15 minutes with its ends fixed, whereby a stretched film was obtained.

The density, opacity, tensile modulus, stability of stretching, thermal shrinkage, curling height and pencil writing property of the stretched film so obtained and the molding property of the film are shown in Table 3 and Table 4.

EXAMPLES 5 TO 10

The procedure of Example 1 was followed except for the following modifications: a propylene homopolymer "TA3" (trade name; MFR: 8 g/10 minutes, crystallization degree: 60%, DSC melt finishing temperature: 172° C.), a cyclic polyolefin "APEL 5018 or RT105R" (trade name) produced by Mitsui Petrochemical Industries, Ltd., a polymethyl pentene resin "RT18 or MX002" produced by Mitsui Petrochemical Industries, Ltd. or a polycarbonate resin "YUPIRON S1000, S3000 or E2000" produced by Mitsubishi Gas Chemical Co., Ltd. were added to the components of Example 1 in a proportion as shown in Table 1 or Table 2. A stretched film was then fabricated following the procedure of Example 1 and the film so obtained was evaluated.

Evaluation results are shown in Table 3 and Table 4.

TABLE 1

| | | | Component Ratio | | | | | | | | | |
|---|---|---|---|---|---|---|---|---|---|---|---|---|
| | | | | | | | Examples | | | | | |
| | | | 1 | 2 | 3 | 4 | 5 | 6 | 7 | 8 | 9 | 10 |
| A | Polyethylene terephthalate resin, produced by Mitsubishi Chemical Corporation | GS385 | — | — | — | 100 | — | — | — | — | — | — |
| | | TGS83A | 100 | 100 | 100 | — | 100 | 100 | 100 | 100 | 100 | 100 |
| B | Modified olefin based resin (described in Referential Example 1) | | 5 | 20 | 80 | 20 | 20 | 20 | 20 | 20 | 20 | 10 |
| C | Low molecular weight polyethylene based resin, "SUNWAX 161P", product of Sanyo Chemical Industries, Ltd. | | 3 | 3 | 3 | 3 | 3 | 3 | 3 | 3 | 3 | 3 |
| D | Epoxy resin, "EPICOAT 828", product of Yuka Shell Epoxy Kabushiki Kaisha | | 3 | 3 | 3 | 3 | 3 | 3 | 3 | 3 | 3 | 3 |
| E-1 | Propylene homopolymer | TA3 | — | — | — | — | — | — | — | — | — | 10 |
| | Cyclic polyolefin based random copolymer resin product of Mitsui Petrochemical Industries, Ltd. | APEL 5018 | 10 | — | — | — | 10 | — | — | — | — | — |
| | | RT105R | — | — | — | — | — | 10 | — | — | — | — |
| | Polymethyl pentene-1 resin product of Mitsui Petrochemical Industries, Ltd. | RT18 | — | — | — | — | — | — | — | — | — | — |
| | | MX002 | — | — | — | — | — | — | — | 10 | — | — |
| | Polycarbonate resin, "YUPIRON", trade name; | S1000 | — | — | — | — | — | — | — | — | 10 | — |

TABLE 1-continued

| | | Component Ratio | | | | | | | | | |
|---|---|---|---|---|---|---|---|---|---|---|---|
| | | | Examples | | | | | | | | |
| | | | 1 | 2 | 3 | 4 | 5 | 6 | 7 | 8 | 9 | 10 |
| product of Mitsubishi Gas Chemical Co., Ltd. | S3000 | — | — | — | — | — | — | — | — | — | — |
| | E2000 | — | — | — | — | — | — | — | — | 10 | — |

TABLE 2

| | | Component Ratio | | | | | | |
|---|---|---|---|---|---|---|---|---|
| | | | Comparative Examples | | | | | |
| | | | 1 | 2 | 3 | 4 | 5 | 6 |
| A | Polyethylene terephthalate resin, produced by Mitsubishi Chemical Corporation | GS385 | — | — | — | — | — | — |
| | | TGS83A | 100 | 100 | 100 | 100 | 100 | 100 |
| B | Modified olefin based resin (described in Referential Example 1) | | 20 | 20 | 20 | 20 | 1 | 120 |
| C | Low, molecular weight polyethylene based resin, "SUNWAX 161P", product of Sanyo Chemical Industries, Ltd. | | 0.5 | 15 | 3 | 3 | 3 | 3 |
| D | Epoxy resin, "EPICOAT 828", product of Yuka Shell Epoxy Kabushiki Kaisha | | 3 | 3 | 0.5 | 15 | 3 | 3 |
| E-1 | Propylene homopolymer | TA3 | — | — | — | — | — | — |
| | Cyclic polyolefin based random copolymer resin product of Mitsui Petrochemical Industries, Ltd. | APEL 5018 | — | — | — | — | — | — |
| | | RT105R | — | — | — | — | — | — |
| | Polymethyl pentene resin product of Mitsui Petrochemical Industries, Ltd. | RT18 | — | — | — | — | — | — |
| | | MX002 | — | — | — | — | — | — |
| | Polycarbonate resin, "YUPIRON", trade name; product of Mitsubishi Gas Chemical Co., Ltd. | S1000 | — | — | — | — | — | — |
| | | S3000 | — | — | — | — | — | — |
| | | E2000 | — | — | — | — | — | — |

TABLE 3

| | | Evaluation results | | | | | | | | | |
|---|---|---|---|---|---|---|---|---|---|---|---|
| | | Examples | | | | | | | | | |
| | | 1 | 2 | 3 | 4 | 5 | 6 | 7 | 8 | 9 | 10 |
| Density | g/cm$^3$ | 1.30 | 1.25 | 1.01 | 1.25 | 1.22 | 1.22 | 1.20 | 1.30 | 1.30 | 1.25 |
| Tensile modulus | 10 dyne/cm$^2$ | 3.25 | 3.24 | 2.90 | 3.0 | 3.5 | 3.5 | 3.6 | 3.7 | 3.7 | 3.1 |
| Opacity | % | 42 | 44 | 43 | 42 | 49 | 55 | 54 | 57 | 59 | 42 |
| Stability in stretching | successful test pieces | 9 | 10 | 9 | 10 | 10 | 10 | 8 | 8 | 8 | 10 |
| Thermal shrinkage | | | | | | | | | | | |
| 120° C., 30 min | % | 0.05 | 0.05 | 0.8 | 0.1 | 0.3 | 0.3 | 0.3 | 0.3 | 0.3 | 0.15 |
| 150° C., 10 min | % | 0.05 | 0.05 | 0.9 | 0.1 | 0.15 | 0.15 | 0.15 | 0.15 | 0.15 | 0.02 |
| Print curling height | mm | 5 | 12 | 20 | 12 | 5 | 5 | 5 | 5 | 5 | 15 |
| Pencil writing property | | 0 | 0 | 0 | 0 | 0 | 0 | 0 | 0 | 0 | 0 |
| Molding property of film | | 0 | 0 | 0 | 0 | 0 | 0 | 0 | 0 | 0 | 0 |

TABLE 4

| | | Comparative Example | | | | | |
|---|---|---|---|---|---|---|---|
| | | 1 | 2 | 3 | 4 | 5 | 6 |
| Density | g/cm³ | 1.3 | 1.1 | 1.3 | 1.1 | 1.4 | 0.96 |
| Tensile modulus | 10 dyne/cm² | 3.5 | 3.0 | 3.5 | 3.0 | 3.5 | 2.7 |
| Opacity | % | 32 | 33 | 32 | 33 | 30 | 35 |
| Stability stretching | successful test pieces | 5 | 8 | 7 | 5 | 7 | 8 |
| Thermal shrinkage | | | | | | | |
| 120° C., 30 min | % | 0.1 | 0.3 | 0.1 | 0.3 | 0.03 | 1.5 |
| 150° C., 10 min | % | 0.1 | 0.15 | 0.1 | 0.15 | 0.1 | 2.0 |
| Print curling height | mm | 20 | 35 | 20 | 35 | 18 | 40 |
| Pencil writing property | | o | x | o | x | x | x |
| Molding property of film | | x | o | x | o | x | o |

While the invention has been described in detail and with reference to specific embodiments thereof, it will be apparent to one skilled in the art that various changes and modifications can be made therein without departing from the spirit and scope thereof.

What is claimed is:

1. A stretched resin film comprising as a base material a resin composition composed of the following components (A), (B), (C) and (D):

(A) a thermoplastic polyester resin
100 parts by weight;

(B) a modified olefin based resin obtained by graft polymerizing 0.01 to 20 parts by weight of an α,β-unsaturated carboxylate based monomer having one to six hydroxyl groups and 0.01 to 50 parts by weight of an aromatic vinyl compound onto 100 parts by weight of an olefin based resin
3 to 100 parts by weight;

(C) a polyethylene resin having a weight mean average molecular weight of 1,000 to 10,000
1 to 10 parts by weight; and (D) a bisphenol epoxy resin
1 to 10 parts by weight.

2. The stretched resin film as claimed in claim 1, wherein the component (B) is prepared by graft polymerizing 2-hydroxyethyl methacrylate as the α,β-unsaturated carboxylate based monomer having a hydroxyl group and styrene as the aromatic vinyl compound onto a crystalline propylene based resin as the olefin based resin and said component (B) has a residual hydroxyl ratio of 0.3 to 1.0.

3. The stretched resin film as claimed in claim 1, wherein the component (A) is a polyethylene terephthalate.

4. The stretched resin film as claimed in claim 1, wherein the component (C) is selected from the group consisting of polyethylene wax, paraffin and carnauba wax.

5. The stretched resin film as claimed in claim 1, wherein the component (D) is a di-glycidyl ether of bisphenol A having an epoxy equivalent of 120 to 500 g/eq.

* * * * *